Feb. 6, 1940.　　　　J. K. LUTHE　　　　2,189,653
CONTROL DEVICE
Filed June 5, 1937　　　　4 Sheets-Sheet 1

INVENTOR.
Julius K. Luthe
BY
ATTORNEY.

Feb. 6, 1940. J. K. LUTHE 2,189,653
CONTROL DEVICE
Filed June 5, 1937 4 Sheets-Sheet 2

INVENTOR.
Julius K Luthe
ATTORNEY.

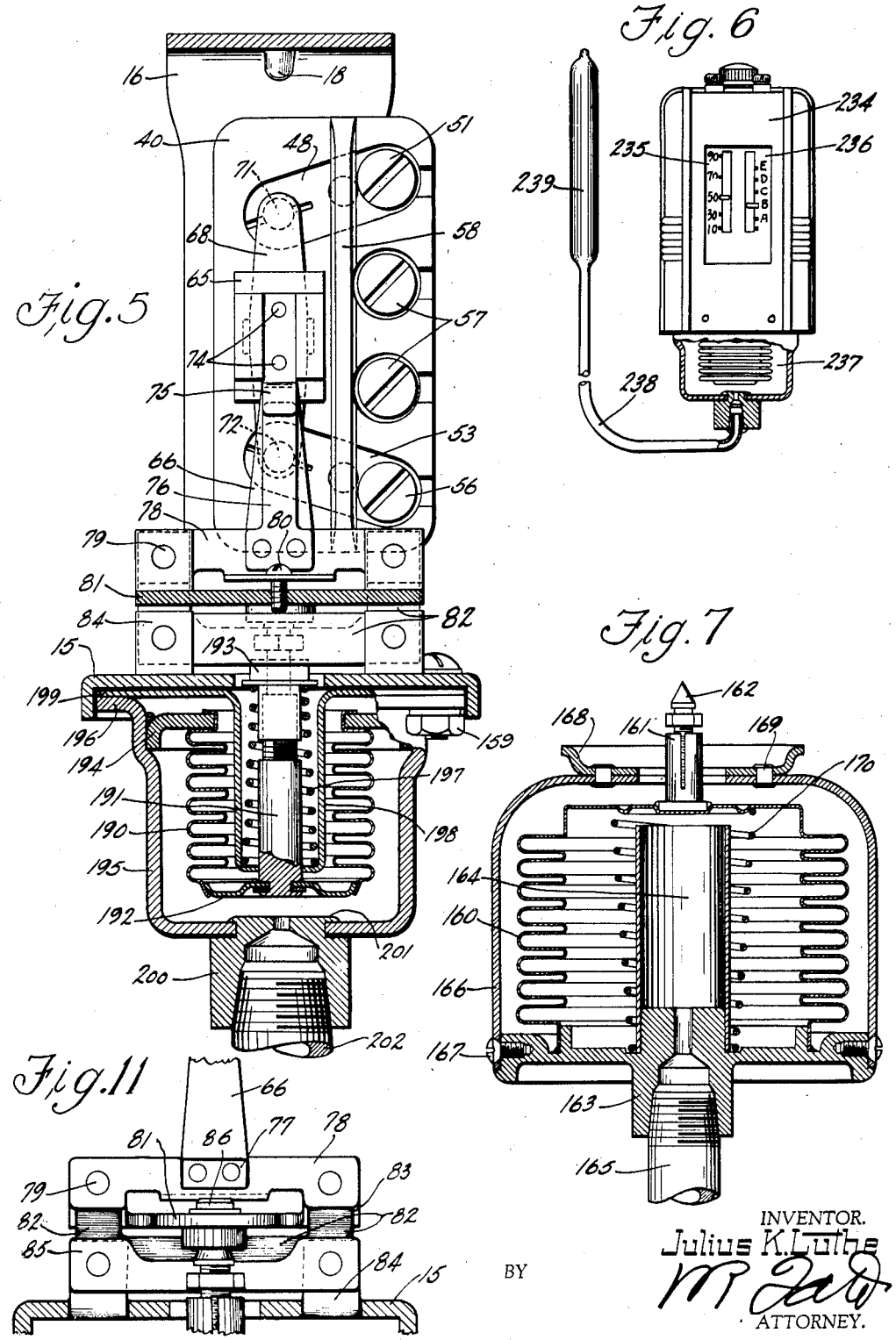

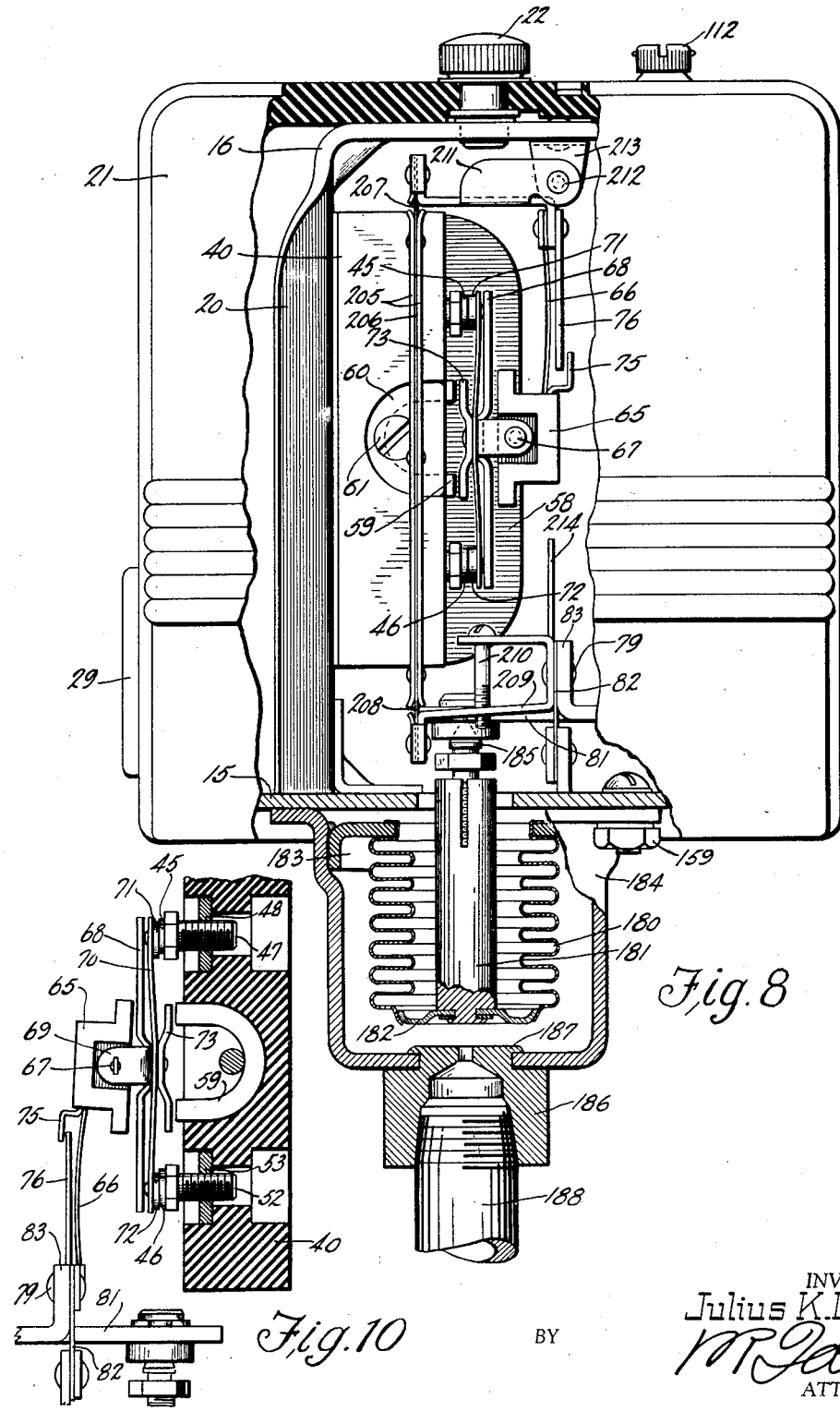

Patented Feb. 6, 1940

2,189,653

UNITED STATES PATENT OFFICE 2,189,653

CONTROL DEVICE

Julius K. Luthe, Milwaukee, Wis., assignor to Perfex Corporation, Milwaukee, Wis., a corporation of Wisconsin Application June 5, 1937, Serial No. 146,610

25 Claims. (Cl. 200—83)

This invention relates in general to control devices and more particularly to automatic control devices for use in air conditioning systems.

In air conditioning systems, it is customary to have some form of heating plant. Sometimes this heating plant is a steam boiler, a hot water boiler, or warm air furnace. Some steam boilers are designed to operate entirely on pressures above atmospheric pressure, while others are designed to operate on pressures below atmospheric pressure and are generally referred to as operating on the vacuum side. Again some steam boilers are designed to operate on both the pressure and vacuum side. In some air conditioning systems it is customary to use either steam or hot water boilers to heat air and then circulate the heated air to the space to be heated or air conditioned. It is also customary in air conditioning systems to control the relative humidity by regulating the amount of moisture that is admitted into the space which is being air conditioned. It is also customary to use various forms of refrigerators for cooling purposes in order to maintain the air in the space at a comfortable temperature.

This invention relates to an automatic control device which will respond to the various physical conditions such as pressure, vacuum, temperature, etc., of an air conditioning system for the purpose of automatically controlling the operation of the heating plant, refrigerator, etc.

It is an object of the invention to provide an improved control device for air conditioning systems which will function to regulate the system in a more reliable and satisfactory manner.

A further object is to produce a control device which will be extremely sensitive and accurate in operation so as to maintain the conditioning system within critical desired values.

An additional object of the invention is to provide a more simplified and positive adjustment for a control device whereby the delicacy of adjustment may be constantly maintained at a critical value.

A further object is to provide a control device in which the electrical switching mechanism functions with a greater degree of snap action, in which flexible connecting wires are eliminated, and which operates in a more reliable manner.

Another object of the invention is to devise an improved control device in which the elements thereof are arranged to be supported in a more compact manner so that ease of adjustment and assembly are attained.

A further object of this invention is to provide a switching mechanism for an automatic control device which will have positive snap action both as the contacts make and as they break the circuit.

Another object of this invention is to provide an automatic control device which is immune to vibration or shock and which will be economical to manufacture and simple to install.

Other objects and advantages reside in certain novel features of construction, arrangement and combination of the parts which will be hereinafter more fully described and particularly pointed out in the appended claims.

Referring now particularly to the accompanying drawings which show a preferred form of the invention:

Fig. 5 is a cross-sectional end view of the device along the line 5—5 of Fig. 1;

Fig. 6 is a view on a smaller scale of a modified form of control device;

Fig. 7 is a cross-sectional view of a modified form of bellows element;

Fig. 8 is a partial cross-sectional view of a modified control device arranged to close the switch upon an increase in pressure;

Fig. 10 is a similar view of the switch mechanism in one of its other positions; and Fig. 11 is a fragmentary view of a portion of the control device.

Figures 1, 9:
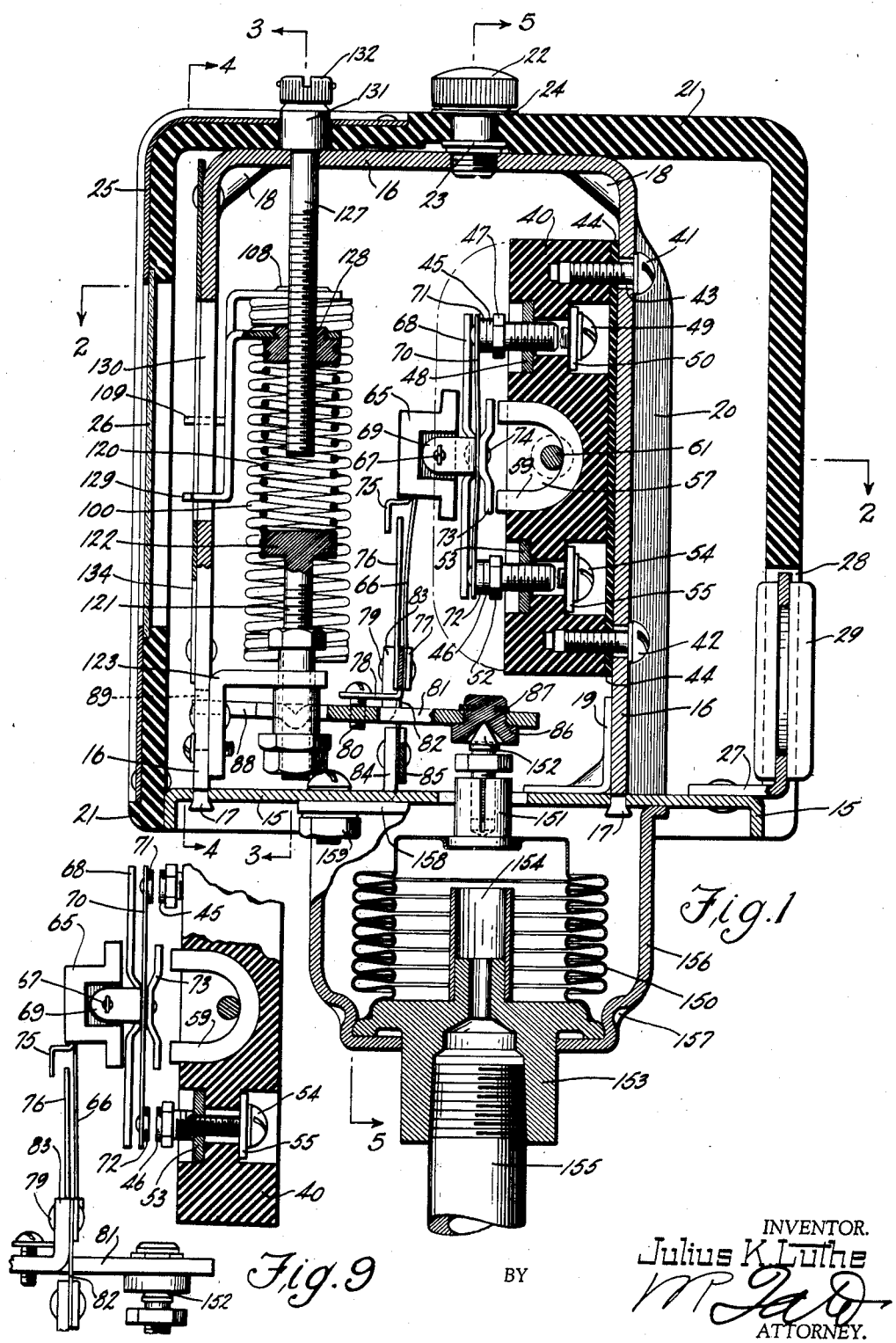
Fig. 1 shows a cross-sectional and enlarged view of the control device arranged to open the switch upon an increase in pressure.
Fig. 9 is a side view partly in section of the switching mechanism in its open position.

Throughout the following description it should be understood that the use of the control device of the invention is not strictly limited to the particular type of air conditioning system with which it has been disclosed, but it may be installed for use in any system whereby a control is to be exercised to govern the degree of temperature, pressure, humidity, vapor, vacuum or refrigerant desired. The use of the term "air conditioning" throughout the description will therefore be understood as referring to any of the above types of conditioning systems. In this connection therefore, the drawings and description disclose various modified forms of a bellows arrangement for actuating the control device. Fig. 1, for example, illustrates a bellows arrangement which has been found satisfactory on pressures up to about 15 pounds; Fig. 5 shows a bellows arrangement operable over a wide range including both pressure and vacuum; Fig. 7 illustrates a bellows arrangement actuated by low pressure or vapor and which will operate on vacuum; while Fig. 8 illustrates a further type of bellows adapted for use in an extremely high pressure system. These various types of bellows are arranged to be inter-changeable with the control device disclosed.

Figure 3:
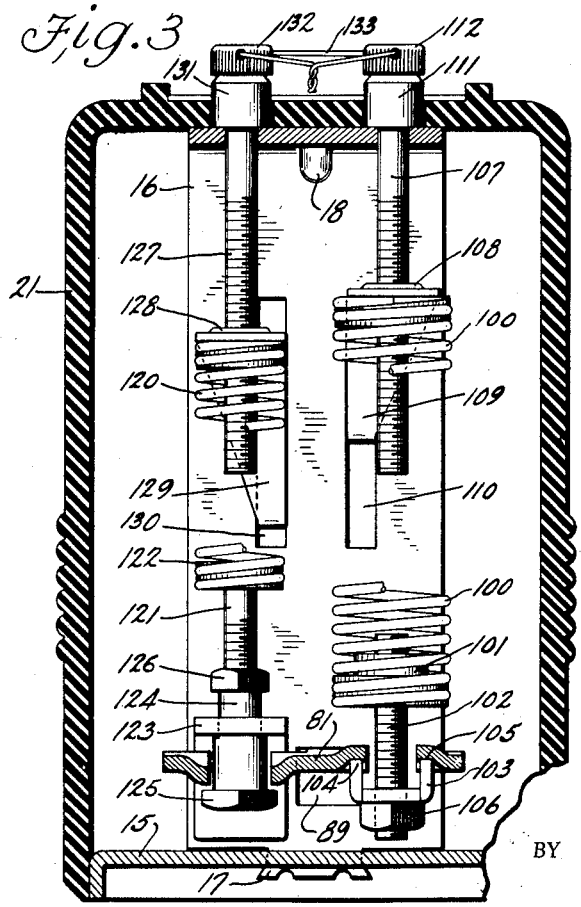
Fig. 3 is a cross-sectional view along the section line 3—3 of Fig. 1 showing the adjusting means for the control device.

Referring now particularly to Fig. 1, the control device shown is arranged to open the switch responsive to an increase in pressure. It comprises essentially a supporting base member 15 having a depending reinforcing flange formed around its periphery, together with a substantially U-shaped bracket 16 having its open ends 17 secured to the base member 15 in any suitable manner such as by a staking operation as is more clearly seen in Fig. 3. The upper connecting portion of the bracket 16 is provided at the corners with reinforcing portions 18 formed therein to stiffen the bracket. A bracket 19 spot-welded to the base 15 and to one leg of bracket 16, serves to more rigidly support this bracket. The right-hand leg of the bracket 16 is arranged along its edges with turned up flanges 20 to further stiffen this leg of the bracket. A housing or cover 21, preferably constructed of some phenolic condensation product such as "Bakelite" serves as a protective enclosure for the control unit mechanism. The bottom edges of the cover 21 embrace the base 15 rather closely to provide a dust tight enclosure. A cover screw 22 loosely secured to the top of the cover 21 by a split washer 23, is threaded into the top of the bracket 16 in order to provide a convenient means of removably attaching the cover in position on the control unit. A spring washer 24 is placed under the knurled head of the cover screw 22 and on top of the cover 21. The split washer 23 engages the bracket 16 and serves as a stop for the screw 22 when it is screwed into bracket 16 while the shank of the screw 22 is of sufficient length at the spring washer 24 securely and in a somewhat yielding manner holds the cover in place without placing any stress upon it.

The front of the cover 21 has a thin metal ornamental name plate 25 attached to it which has an opening in it for the accommodation of a window 26 so that a reading of the scale of the control unit may be had. The rear end of the supporting plate 15 has an L-shaped bracket 27 suitably attached to it which extends through an opening 28 in the bottom edge of the cover 21. A rubber grommet 29 is arranged in an opening of the bracket 28 and provides a means whereby connecting line wires are fed into the control unit, or the grommet may be removed and a conduit connection made to the bracket.

The means for actually controlling the physical condition to which the control device responds is here shown in the form of a switching mechanism which controls the circuit of some air conditioning device. This switching mechanism comprises a supporting terminal block 40 constructed of insulating material which is clamped to the reinforced leg 20 of the bracket 16 by means of a pair of holding screws 41 and 42 threaded into the rear surface of the terminal block 40. The holding screws 41 and 42 extend through enlarged openings or slots 43 in the bracket 16 so that the block 40 may be accurately positioned. A further insulating plate 44 is clamped between the rear surface of the block 40 and the bracket 16.

Figure 2:
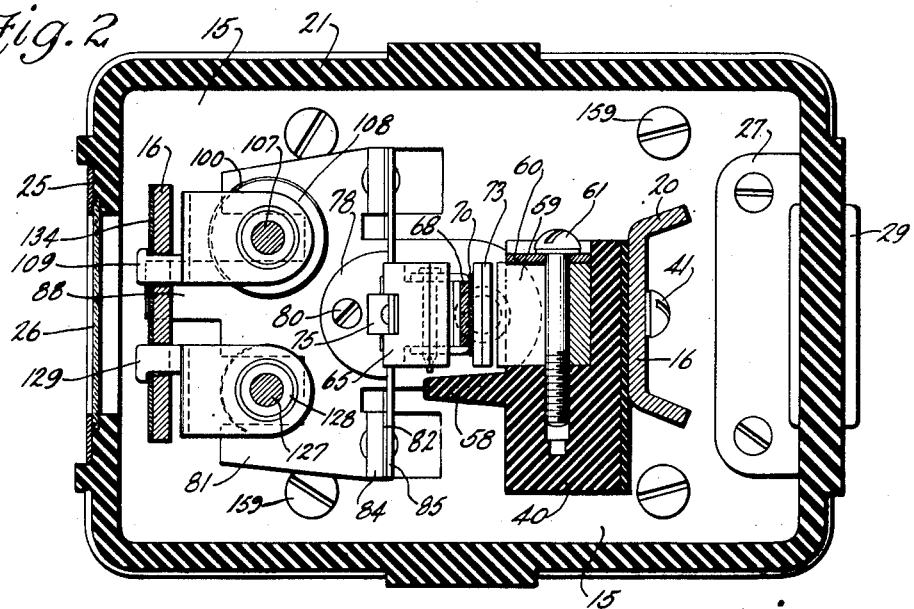
Fig. 2 is a cross-sectional top view of the device taken along the line 2—2 of Fig. 1.

A pair of control elements here shown as stationary or fixed contacts 45 and 46 are arranged in spaced relationship on the terminal block 40. Fixed contact 45 is provided with a threaded adjustable stud 47 which is screwed into a metal terminal plate 48, while clamping screw 49, together with clamping plate 50 on the rear of the terminal block 40, clamps the terminal plate 48 in the block. A terminal screw 51 (see Fig. 5) for attachment of the connecting wire, is likewise threaded into terminal plate 48 on the front side thereof. The other stationary contact 46 is similarly arranged with a threaded stud 52 screwed into the terminal plate 53 which in turn is clamped in the block 40 by a clamping screw 54 and clamping plate 55. A second terminal screw 56 (see Fig. 5) for another connecting wire also threads into the front of plate 53. A pair of auxiliary terminal screws 57 are attached to the block 40, but without any internal connection with the switching mechanism. In order to preclude the possibility of the connecting wires attached to the terminal screws 54 and 55 from coming into contact with or fouling the contacts, a barrier member 58 (Figs. 2 and 5) formed integrally with block 40 is provided and forms a separating partition. Arranged in the terminal block 40 and between the stationary contacts 45 and 46 is a horse-shoe shaped permanent magnet 59 having its open pole ends extending outwardly from the block. The magnet 59 is clamped into position on the block 40, by means of the metal plate 60 and screw 61 threaded into block 40.

The movable portion of the switching mechanism comprises essentially an insulating supporting member or block 65 rigidly attached to the free end of a resilient operating member 66. The supporting block 65 is provided with a pivot 67 to which a rigid bar 68 is attached by means of ear-shaped members 69 which are formed as a part of the rigid bar 68. A flexible contact supporting member or arm 70 is arranged on one side of the rigid bar 68 and supports the movable control elements here shown as contacts 71 and 72 at its extreme ends and in operative relation to the associated stationary contacts 45 and 46. An iron armature 73 is arranged on the other side of flexible arm 70 and in a position to be influenced by the permanent magnet 59. By turning the adjusting studs 47 and 52 the gap between the pole edges of the magnet 59 and the surface of the armature 73 may be varied when the contacts are in closed position, and in order to maintain this adjustment constant the terminal plates 48 and 53 are split where the studs are threaded into them so as to tightly grip the threads. The rivets 74 clamp the elements 68, 70 and 73 rigidly together at their approximate center so that they may freely pivot or rotate as a unitary structure about the pivot 67 in the block 65, such pivotal movement of the unitary structure being limited by engagement of the bar 68 with the stop surfaces provided by the upper and lower edges of the block 65. A stop member 75, together with the resilient member 66 is secured to the rear side of the insulating block 65 and is in a position to be engaged by the end of a relatively stiff arm 76 which is positioned parallel to the resilient member 66. The resilient member 66 and the stiff arm 76 are clamped together at one end to a plate 77 and an L-shaped adjusting bracket 78 by the rivets 79. An adjusting screw 80 extends through one side of the bracket 78 for adjusting the position of the bracket and consequently the arms 66 and 76 with respect to an operating beam 81 as will be pointed out.

The rigid operating beam 81 for operating the switching mechanism is hinged and supported by means of a thin leaf spring 82 at its approximate center. One end of the hinge spring 82 is clamped to the beam 81 between a turned up portion 83 of the beam and the bracket 78. The other end of the hinge spring 82 is clamped to a turned up portion 84 of the base plate 15 by a clamping plate 85 as more clearly seen in Fig. 11. One end of the operating beam 81 is provided with a bushing 86 extending therethrough and removably attached to the beam by means of a split washer 87 engaging a collar on the bushing. The bushing 86 is formed with a cone shaped depression in its bottom in which the actuating means for the beam is positioned. The other end of the operating beam 81 has a projection 88 which extends through an opening 89 in the lower end of the bracket 16 so that any abnormal or excess movements of the operating beam 81 is limited. With the foregoing arrangement in mind, it is seen that rocking of the beam 81 about its hinge 82 results in the movement of the resilient arm 66. The detailed manner in which this is accomplished will be pointed out hereinafter.

Arranged within the casing 21 there is a main adjusting means for regulating the point at which the control device is to operate. This adjustment includes a main adjusting spring 100. One end of this spring has several coils threaded onto a bushing 101 which in turn has an adjustable stud 102 threaded through it for holding one end of the spring. A pivoted bracket 103 having pointed ends 104 engaging small depressions 105 in the bottom of operating beam 81, supports the end of the stud 102 by means of the nut 106. By means of the pivoted bracket 103, the stud 102 and the end of main spring 100 have a slight degree of free movement in any horizontal direction. The upper end of the spring 100 is held by the adjusting stud 107 and the bushing 108. The outside of the bushing 108 threads into holding engagement with the end coils of the spring 100 and the inside is in threaded engagement with the stud 107. An indicating arm 109 is riveted at one end to the top of the bushing 108 so as to be movable therewith, and the other end extends through an opening 110 of the bracket 16 to the front side thereof. A bushing 111 around the upper end of the stud 107 above bracket 16 serves as a bearing for a knurled and slotted head 112 of stud 107. The knurled head 112 of the stud 107 extends through to the outside of the cover 21 and provides an accessable means for adjusting or tensioning the coil spring 100, and thereby adjusting the point at which the control device is to function.

Figure 4:
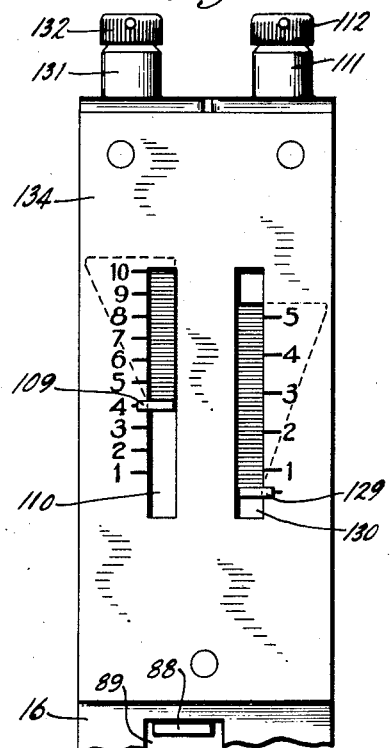
Fig. 4 is a front view of the graduated indicating scale, taken along the line 4—4 of Fig. 1.

A differential adjusting coil spring 120 is arranged adjacent the main adjusting spring 100 but is somewhat smaller. The lower end of this differential spring 120 is held by a stud 121 having an enlarged end 122 threaded into several of the end convolutions of the spring 120. An adjustable bracket 123 attached to the lower end of the bracket 16 serves as a stop for the stud 121 by engaging a shoulder portion formed on a bushing 124 into the end of which the stud 121 threads. The opening for the bushing 124 in the bracket 123 is somewhat larger than the bushing in order to permit it to have free movement. The bushing 124 is provided at its lower end with an integral nut 125 and at its upper end the stud 121 is securely locked in position on the bushing by means of the locknut 126 threaded on the stud. The top surface of the nut 125 effects a control upon the operating beam 81 by engaging punched out projections formed in the bottom of the beam whenever the beam is rocked or moved to engage the nut. An adjustable stud 127 is arranged at the upper end of the spring 120 and is provided with a bushing 128 into which it threads. The bushing 128 is arranged with a threaded outer portion engaging the end coils of the differential spring 120 in a manner so that the turning of the stud 127 will effect either a contraction or an expansion of the spring 120. An indicating arm 129 is fastened at one end to the bushing 128 so as to be movable therewith and the other end extends through an opening 130 in the bracket 16. At the upper end of the stud 127 a bushing 131 through which the stud extends provides a bearing for the stud against the upper surface of the bracket 16. A knurled and slotted head 132 on the end of the stud 127 bearing against bushing 131 provides a convenient means for adjusting the tension of the differential spring 120 from the outside and top of the cover 21. Small holes drilled in the adjusting heads 112 and 132 provide a means for inserting a wire 133 so as to seal the adjustments in a particular set position. An indicating scale plate 134 is supported on the front side of the bracket 16 and in a position behind the window 26 of the cover 21 so that the graduated scale reading as shown in Fig. 4 is clearly visible.

The switching mechanism previously described is actuated by some means which responds to a physical condition and is here shown as consisting of a bellows 150 which responds to pressure and is of the usual constructional form. The bellows is provided at its upper end with the threaded stud 151, suitably secured to the top of the bellows as by a sweating operation. An adjustable pivot element 152 threads into the stud 151 and has its point in pivoted contact with the depression in the bushing 86 of the operating beam 81. The lower end of the bellows 150 is attached as by soldering to the combination supporting plate and connecting nut 153. A hollow tube 154 engages a shoulder of the plate 153 and extends upward inside the bellows for a distance sufficient to prevent the collapse of the bellows when subjected to abnormal conditions such as that caused by a vacuum. A connecting pipe 155 threads into the nut end of the supporting plate 153 to provide a connection between the system to be controlled and the control device. A supporting and enclosing cup 156 for the bellows is arranged at its lower end to support the plate 153 as by a number of indentations 157 in the cup, and at its upper end is provided with a flange 158 by means of which a number of bolts and nuts 159 secure the cup to the lower surface of supporting base 15.

With the foregoing adjusting elements in mind, it will be seen that by turning the knurled head 112 until the indicator 109 is moved to a desired point on the indicating scale 134, the exact value at which the switching mechanism will be tripped to closed position is determined. A certain amount of tension stored in the main adjusting spring 100 therefore constantly exerts its influence through the medium of the operating beam 81 against the pressure exerted by the conditioning system being controlled through the bellows 150. As a result when the pressure in the system rises the bellows 150 expands and trips the switching mechanism to open position.

To adjust the differential setting the knurled head 132 is turned until the indicator 129 is moved to a point on the indicating scale which will indicate the differential desired between the cut-in pressure and the cut-out pressure at which the switching mechanism is to be operated. The turning of the head 132 varies the tension stored in the differential spring 120 and therefore a certain amount of force is exerted upon the bottom of the operating beam 81 when it engages the nut of bushing 125 as the switching mechanism trips to its open position. By adding up the indicating scale readings of both indicators 109 and 129 the cut-out pressure or value at which the switching mechanism is operated to its open position may be determined. It should be noted that the position of beam 81 at the time the switching mechanism moves to closed position is determined entirely by the tension of the main adjusting spring 100, whereas the position of the beam 81 at the time the switching mechanism is moved to open positon is determined by the tension in both the main adjusting spring 100 and the differential adjusting spring 120. This is accomplished by arranging the differential mechanism in such a way that beam 81 is not in engagement with the nut 125 of bushing 124 at the time the switching mechanism moves to closed position. As the bellows 150 expands it rocks beam 81 against the tension of the main operating spring 100. After the beam 81 has moved a certain distance it then engages nut 125 and thereafter the bellows 150 must rock the beam 81 against the tension of both the main spring 100 and the differential spring 120 until the switching mechanism is tripped to open position. In this way the pressure at which the switching mechanism is moved to closed position is determined entirely by the tension of main spring 100, whereas the pressure at which the switching mechanism is moved to open position is determined by the tension of both the main spring and differential spring.

The control device herein disclosed is adaptable for use in connection with various types of conditioning systems as has been pointed out. For example, in Fig. 1, it is shown equipped with a low pressure bellows suitable for pressures from 0 to 15 pounds. Fig. 7 illustrates a type of bellows adapted for use in extremely low pressure or vapor systems. In Fig. 5 another form of bellows arrangement is disclosed which is adaptable for use in systems where the control has to operate on pressures both above and below atmospheric pressure. Fig. 8 discloses a type of bellows arranged for operation in a system having high pressure. All of the foregoing types of bellows are arranged so that they may be interchangeably associated with the control device disclosed. As a manner of convenience therefore it has been chosen to illustrate a different type of bellows with each of the various views of the control device disclosed.

Fig. 7 shows a type of low pressure bellows element adopted to operate the control device in a manner similar to that of Fig. 1. It is provided with the usual bellows member 160 having a threaded stud 161 secured to its upper end and an adjustable element 162 secured to the stud. A combination supporting plate and nut 163 is arranged to suitably secure the lower end of the bellows 160 thereto and in addition has a shoulder on which a hollow tube 164 is supported. A connecting pipe 165 threads into the lower side of supporting plate 163. An inclosing cup 166 provided with screws 167 for securing the supporting plate 163 thereto, has a flanged member 168 secured as by rivets 169 to the top of the cup 166 whereby the bellows unit may be supported from the lower side of the supporting base 15 (Fig. 1). A compressed coil spring 170 placed around the tube 164 exerts a slight pressure from the inside of the bellows 160 to maintain the pivot point 162 in contact with the operating beam 81 as required when the low pressure system to which the device is connected is operating on the vacuum side.

The bellows construction shown in Fig. 8 is arranged to be associated with a system operating at relatively high pressures. A bellows 180 is attached at its bottom end to a rod 181 by means of a plate 182 in any suitable manner, and the upper end of the bellows engages and is secured around an opening in a supporting plate 183. This plate 183 in turn is attached to a shoulder formed around an enclosing cup 184. The cup 184 is attached to the base 15 by means of the bolts and nuts 159 engaging a flange on the cup. The rod 181 has its upper end provided with a pivoting member 185 engaging the operating beam 81. The lower end of the cup 184 has a connecting nut 186 fastened to it by a turned over portion 187 of 186. A connecting pipe 188 may be threaded into the nut 186. It should be noted that the pressure is on the outside of the bellows 180 as distinguished from Fig. 1.

Referring to Fig. 5 the bellows construction illustrated therein is of the type adapted to operate over a rather wide range. It comprises a bellows element 190 of somewhat similar but more substantial construction than that disclosed in Figs. 1 and 7. A rod 191 is suitably secured as shown to the plate 192 to which the lower end of the bellows 190 is fastened. A stud 193 provided with a collar is threaded upon the upper end of the rod 191 and in turn has an adjustable pivoting member threaded upon it similar to the pivot member 152 of Fig. 1. A supporting plate 194 is provided with an opening therein around the edge of which the upper end of the bellows 190 is suitably secured, and an outside flanged edge of the plate 194 engages and is fastened to a ledge around the inside of an inclosing cup 195. A flange 196 around the cup 195 provides a means for supporting the bellows unit to the lower side of supporting base 15 as by the several bolts and nuts 159. Surrounding the rod 191 is a compression spring 197, one end of which engages the collar of the stud 193 while the other end bears against the inside of a hollow tube 198. The tube 198 has a flange 199 at its upper end which is clamped between the base 15 and the flange 196 of the cup 195. The rod 191 is in slidable relation to an opening in the bottom of the tube 198 so as to permit movement of the rod 191 whenever the bellows expands or contracts. The purpose of the spring 197 is to maintain the pivot member 152 in engagement with the socket in bushing 86 when the device is operating on the vacuum side. The bottom of the cup 195 has a connecting nut 200 fastened to it by a turned over portion 201 of the nut 200 and a connecting pipe 202 threads into this nut as shown.

From the foregoing description of the various types of bellows it will be seen that each of them has a pivoting member such as 152, 162 and 185 which is in actuating engagement with the operating beam 81 and it therefore follows that any change in the contraction or expansion of the various bellows is instantly transferred into a movement of the operating beam 81 about its hinge point 82.

The modification of the control device illustrated in Fig. 8 shows an arrangement of the switching mechanism in which the contacts are arranged to close the switch upon an increase in pressure. As illustrated the pressure has assumed a value in which the switch contacts are being held in their closed position. The switching and actuating mechanism of this device is generally the same as that of Fig. 1. It differs somewhat by having a connecting link member comprising a pair of stiff reinforcing members 205 arranged on each side and riveted to a thin spring member 206. This connecting link forms a hinge 207 at the upper end of the link and a second hinge 208 at the lower end. The lower hinge 208 is connected with a U-shaped bracket 209 which in turn is rigidly attached by rivets 75 to the beam 81 and movable with the beam 81. An adjusting screw 210 provides an adjustment of the link with respect to the beam 81. The upper hinge 207 connects with one end of a bracket 211 which in turn is hinged by the pin 212 to a supporting bracket 213 supported on the bracket 16. The bracket 213 supports the rigid arm 76 and the resilient operating arm 66 which carries the contact switching mechanism. An insulating plate 214 limits the opening movement of the switching mechanism. With the foregoing arrangement of elements in mind it will be seen that rocking movement of the operating beam 81, about its hinge pivot 82 by the actuating means 185 upon an increase in pressure, results in an upward thrust of the bracket 209. This movement is transmitted by the link member 205 to the bracket 211 through the hinges 207 and 208. The bracket 211 is thereby actuated to effect a contact closing operation of the switching mechanism. The complete movement is effective directly upon the switching mechanism without the use of loose pivots or hinges which usually cause some lost motion to take place.

Fig. 6 illustrates a control unit 234 construction similar to that of Fig. 1 but which has a main indicating scale 235 arranged to read in degrees and a differential scale 236 arranged with arbitrary calibration. A pressure bellows chamber 237 similar to that previously pointed out is connected by a small tube or pipe 238 with a temperature bulb or element 239, all of which are charged with a fluid or gas which is sensitive to temperature changes. On an increase in the temperature of the bulb 239 the gas expands and increases the pressure in the chamber 237 whereby the switching mechanism is operated as in the other devices disclosed. This arrangement is adaptable for use in air conditioning systems where it is desired to establish a control from temperature changes rather than from pressure changes.

In Fig. 1 the bellows arrangement is indicated as being in a position where the system to which it is connected has not built up sufficient pressure to overcome the tension of the main spring 100, and the movable and stationary contacts are therefore in contact. The switch is opened by a rise in pressure. In Fig. 8 the high pressure bellows is shown contracted by the pressure and the switch contacts are in their operative or closed position and are opened by a drop in pressure.

In mass production of control devices of this nature it will be appreciated that upon initial assembly some slight variations between the individual parts are possible and in order to arrange it so that all of the devices will respond exactly alike when subjected to the same temperature or pressure values, a number of simple adjustments are provided for calibrating them. After the complete assembly of a control device as illustrated in Fig. 1 for example, the pipe 155 is connected to a controllable source of pressure for calibrating the device. The knurled head 112 of the main spring 100 is then turned until the pointer 109 indicates a reading of 3 pounds for example, on the scale plate 134. The pressure in the bellows 150 is then built up until the switch contacts open, and then lowered to 3 pounds at which points the switching mechanism should just close the contacts. At this point the beam 81 should be balanced on its pivot between the pressure of the bellows and that exerted by the main spring 100. To provide an adjustment for the beam 81 the nut 106 may be turned on the stud 102 and also the adjustable pivot element 152 may be turned in the threaded stud 151. The knurled head 132 is now turned to adjust the differential spring 120 so that its pointer 129 indicates a differential of say one pound on the scale 134. The pressure in the bellows is now raised and lowered to open and close the switching mechanism and the adjusting screw 80 is turned so that the beam 81 does not engage the head of nut 125 when the switching mechanism is just closed but does engage the nut 125 shortly after the beam starts moving toward switch opening position. Next the nut 125 is turned to move the stud 124 upon the differential stud 121 until the switching mechanism just opens when the pressure of the bellows reaches four pounds, after which the lock nut 126 is turned down to lock the adjustment. The control device will now open the switch contacts when the pressure is raised to 4 pounds and will again close the switch contacts when the pressure is lowered to 3 pounds. The adjusting heads 112 and 132 may now be changed from time to time to cause the switching mechanism to operate at any desired pressure and differential as indicated on the scale plate 134.

The operations concerning the actuation of the switch-mechanism, together with the advantages of the type of construction disclosed will now be pointed out in more detail. Referring particularly to Fig. 9 this shows the switching mechanism in its open position in which the movable contacts are separated from the stationary contacts. Assume for example that the operating beam 81 is operated responsive to a contraction of the associated bellows brought on by a pressure drop as indicated in Fig. 1. This rocks the beam 81 in clockwise direction about its hinged pivot 82. Accordingly, the turned up portion 83 of the beam 81 tilts to the right and with it the resilient arm 66 and the stiff arm 76. A corresponding movement is thereby effected by the supporting block 65, the rigid arm 68, the flexible connecting member 70, and the armature 73. As soon as the armature 73 comes within the influence of the magnetic field generated by the permanent magnet 59 the resilient operating arm 66 begins to flex further away from the rigid arm 76. As the armature 73 moves closer to the pole ends of the magnet 59 the magnetic field becomes increasingly stronger and the pull exerted by the magnet upon the armature becomes correspondingly greater. The movement of the armature, the flexible arm 70 carrying contacts 71 and 72, and the rigid arm 68 is consequently considerably accelerated and the contacts engage with a distinctive snap action. As the movable contacts 71 and 72 engage the stationary contacts 45 and 46 as shown in Fig. 1, a slight wiping action takes place between the contacts to maintain good contact between them. This slight wiping action is brought about by the flexure of the flexible arm 70 which occurs as the movable contacts engage the fixed contacts and the stiff arm 68 comes into contact with the rear side of the movable contacts 71 and 72 on the end of the flexible arm 70. The rigid arm 68 serves as a stop to halt the motion of the switching mechanism and prevent the actual engagement of the armature 73 with the pole faces of the magnet 59. The motion of the operating beam 81 is halted by the control it establishes through closing its switching mechanism so that the pressure in the system again begins to build up. The resilient arm 66 remains in a slightly bowed position as shown in Fig. 1, with the operating beam 81 balanced between the pressure built up in the bellows 150 which pressure has now been brought under control, and the tension of the main adjusting spring 100.

The impact of the movable contacts upon the fixed contacts is cushioned by the flexible arm 70 and should there be any tendency for the rigid bar 68 to bounce or vibrate when it engages the rear of the movable contacts, such bouncing or vibration will not affect the contacts since the movable contacts are held against the fixed contacts by the tension of the flexible arm 70.

When the operating condition is reversed and the switch is to be opened, the pressure increases in the bellows thereby moving or rocking the operating beam 81 in a reverse direction. The resilient operating arm 66 is consequently further bent or pulled by the beam 81 as shown in Fig. 10, and due to the magnetic influence exerted by the magnet 59 upon the armature 73 a considerable greater force must be exerted by the beam 81 upon the resilient arm 66, resulting in a flexing of the arm 66 into a shorter radius. As a result the whole switching mechanism including block 65 is moved slightly downward as shown in Fig. 10, so that the movable contacts 71 and 72 are moved with a wiping action with respect to fixed contacts 45 and 46. When sufficient tension has been stored in the resilient arm 66 to overcome the pull of magnet 59 upon the armature 73, the contacts are separated with a positive snap action. A further slight wiping action is effected by the movable contacts as flexible arm 70 moves away from rigid arm 68. After the switching mechanism is in the position shown in Fig. 9 the resilient arm 66 and rigid member 76 assume their parallel relationship. The snap action occurring upon the opening of the switch mechanism, it may be stated, is brought about by the tension which has been stored in the resilient operating arm 66 due to a rise in pressure, pulling the switching mechanism against the pull exerted by the magnet upon the armature. The flexible arm 70 is so arranged that it holds the movable contacts in engagement with the fixed contacts until the point or balance of power between the magnet and the resilient arm 66 has been passed beyond which the magnet can no longer influence the armature, and the resilient arm 66 therefore is effective to exert the full force of its stored energy to disengage the contacts with a positive snap action. The flexible arm 70 has sufficient resiliency to maintain the contacts closed when the rigid arm 68 moves away from it until after the aforesaid point of balance has been passed. It is therefore seen that the positive snap action occurs through the combined action of a resilient operating arm, a flexible contact arm and the magnet.

Should it occur that any of the sets of movable and fixed contacts have a tendency to stick or become welded due to the passage of considerable current through them, a positive separation is provided for upon the operating beam moving to its reversed position to open the switch. When this condition occurs the stiff arm 76 forcibly engages the stop member 75 on the block 65 and thereby provides sufficient leverage to separate the contacts when the resilient operating arm 66 is not by itself strong enough to do so. Because the operating arm 66 is flexed to a greater degree when this condition occurs, the switching mechanism pivoted at 67 moves a greater distance downward as shown in Fig. 10 thereby further providing a positive break of the contacts.

When the sets of contacts are in their closed position the influence of the permanent magnet upon the armature immovably maintains the contacts in their closed position regardless of the amount of vibration or shock to which the control device may be subjected. Adequate contact pressure is also continually maintained on the closed contacts eliminating the resultant pitting of the contacts and any tendency toward heat generation. By providing a positive snap action for the closing and the opening of the contacts accurate and reliable operation is effected and the formation of destructive arcs between the contacts whenever they make and break is eliminated.

One of the connecting wires, as has been pointed out heretofore, is attached to the terminal screw 51 so that the electrical control circuit extends from the screw 51, the terminal plate 48, stud 47 to the stationary contact 45. The other connecting wire is attached to the terminal screw 56 and this extends a circuit through the terminal plate 53, stud 52 to the stationary contact 46. Whenever the switch mechanism is in its closed position the flexible arm 70 and the rigid arm 68 electrically form a bridge circuit between movable contacts 71 and 72 and the stationary contacts 45 and 46 and the aforesaid electrical circuit therefore passes in series through both sets of contacts. Due to the hinge support 67 for the switching mechanism it will be obvious that the opening of either set of contacts 71 and 45 or contacts 72 and 46 respectively, will effect a break in the electrical circuit. Because of this hinge pivot construction with respect to the operating arm 66, the flexible arm 70, the rigid arm 68, and the armature 73 may effect a slight rotation to open either one or the other sets of contacts. By providing this arrangement it is insured that an actual opening of the circuit is effected when it is intended that this condition is to be brought about regardless of the position in which the control unit is supported or mounted. By arranging the movable contacts with a connecting bridge between them to electrically connect the fixed contacts, the use of flexible tie wires or "pig tail" connections to the moving switch mechanism is entirely obviated thereby eliminating a source of constant trouble experienced with conductors as usually attached to movable elements.

It may be desirable in certain instances to effect a connection of the connecting wires extending the control device from the left-hand side instead of the right as illustrated in Fig. 5. This may be conveniently accomplished by merely removing the attaching screws 41 and 42 from the block 40, reversing it end for end, and loosely supporting it to bracket 16 with the screws, after which accurate alignment of the fixed contacts 45 and 46 is then brought about by movement of the block 40 and screws 41 and 42 in the slots 43 in bracket 16. No further adjustment is required and the screws are then tightened to the block.

While the invention has been disclosed as being applied to particular preferred embodiments of the same it will be understood that certain modifications thereof may be made which are within the skill of those versed in the art and it is therefore desired that the invention be not limited to the precise forms illustrated and described but only by the scope of the appended claims.

I claim as my invention:

1. A control device comprising, a pair of movable contacts, a pair of stationary contacts arranged in operative relation to said movable contacts, a flexible member extending between said movable contacts for supporting them in spaced relationship, a resilient operating member for moving said movable contacts into engagement with said stationary contacts, an insulating member attached to said resilient operating member and pivotally supporting said flexible member, a rigid bar also pivoted to the insulating member and arranged to engage the backs of the movable contacts after they engage the stationary contacts, and magnetic means for causing the contacts to open and close with snap action.

2. A control device comprising, a base, a pair of fixed contacts and a permanent magnet mounted on the base, a rigid bar, a flexible arm on the rigid bar, a pair of movable contacts supported on the rigid bar in operative relation to the fixed contacts with at least one of the movable contacts carried on the flexible arm in spaced relation to the rigid bar when the movable contacts are out of engagement with the fixed contacts, an armature associated with the movable contacts in operative relation to the permanent magnet, said flexible arm and armature secured to the rigid bar as a unitary structure, the fixed contacts acting as stops for the rigid bar for preventing the armature from actually engaging the permanent magnet, a resilient actuator responsive to a physical condition for moving the armature into and out of the influence of the permanent magnet whereby the movable contacts engage and disengage the fixed contacts with snap action, and means for pivoting the unitary structure upon the end of the resilient actuator for providing equal pressure upon both sets of contacts.

3. A control device comprising, a base, a pair of spaced contacts and a permanent magnet mounted on the base, a movable member, an armature carried on the movable member in operative relation to the permanent magnet, a rigid bar arranged to bridge the spaced contacts for completing an electrical circuit therethrough and for preventing the armature from actually engaging the permanent magnet, a flexible arm supported in spaced relation to the rigid bar and extending between the rigid bar and at least one of the spaced contacts for maintaining the circuit for a short time as the rigid bar moves away from the spaced contacts, said rigid bar and flexible arm secured together as a unitary structure, a resilient actuator for the movable member whereby the spaced contacts are automatically bridged and unabridged with snap action, and means for pivoting the unitary structure upon the end of the resilient actuator to provide equal pressure upon the contacts.

4. A control device comprising, a base, a pair of spaced contacts and a permanent magnet mounted on the base, a resilient actuator having one end mounted on the base and responsive to a physical condition, an armature mounted on the movable end of the actuator in operative relation to the permanent magnet, a rigid bar arranged to bridge the spaced contacts for completing an electrical circuit therethough and for preventing the armature from actually engaging the permanent magnet, a flexible arm mounted on the rigid bar and extending between one end of the rigid bar and one of the spaced contacts whereby the spaced contacts are first bridged by the flexible arm and then by both the flexible arm and the rigid bar as the rigid bar is moved toward the spaced contacts, said rigid bar and flexible arm secured together as a unitary structure, means for pivoting the unitary structure upon the end of the resilient actuator to provide equal pressure upon the contacts, and means for limiting the pivotal movement of the unitary structure.

5. A control device comprising a base, a pair of fixed contacts and a permanent magnet mounted on the base, a rigid bar, a flexible arm on the rigid bar, a pair of movable contacts supported on the rigid bar in operative relation to the fixed contacts with at least one of the movable contacts carried on the flexible arm in spaced relation to the rigid bar when the movable contacts are out of engagement with the fixed contacts, an armature associated with the movable contacts in operative relation to the permanent magnet, said rigid bar, said flexible arm and said armature secured together as a unitary structure, the fixed contacts acting as stops for the rigid bar for preventing the armature from actually engaging the permanent magnet, an operating beam hinged for pivoted movement, a physical condition responsive means connected to the operating beam for controlling the same, adjustable spring means associated with the beam for modifying the movement of the same by the condition responsive means, a resilient arm connected to the operating beam for moving the armature into and out of the influence of the magnet whereby the movable contacts engage and disengage the fixed contacts with snap action, and means for pivoting the unitary upon the end of the resilient arm to provide equal pressure upon the closed contacts.

6. In a control device comprising a condition responsive element, an operating beam pivoted for actuation by the condition responsive element, a resilient operating arm attached at one end to the beam and controlled thereby, a flexible arm and an armature attached together as a unitary structure, means for pivoting the unitary structure to the other end of the resilient arm, a movable contact supported on each end of the flexible arm, a fixed contact arranged in operative relation to each movable contact, a permanent magnet arranged to influence the armature, said condition responsive element actuating the beam in one direction to move the armature into the influence of the magnet until the contacts close with a snap action and at the same time tension the flexible arm and the resilient arm, the pivoting of the unitary structure at the end of the resilient arm providing equal pressure upon the closed contacts, the operation of the beam in the reverse direction additionally tensioning the resilient arm until the influence of the magnet is overcome and the balance of power between the magnet and resilient arm is reached whereby the contacts open with a snap action, the flexible arm maintaining the contacts closed until a position is reached beyond the balance of power between the magnet and resilient arm.

7. A control device comprising, a base, an operating beam pivotally supported on the base, physical condition responsive means for effecting a movement of the beam, a spring connected to the beam for modifying the effect of the condition responsive means upon the beam, means on said base and connected to one end of the spring for adjustably varying the modifying effect of the spring upon the beam, means on said beam connected to the other end of the spring for calibrating the modifying effect of the spring upon the condition responsive means, control means comprising a fixed and a movable element, a permanent magnet and said fixed element mounted on the base, a resilient actuator having one end mounted on the operating beam, an armature carried on the free end of the actuator in operative relation to the magnet, and resilient means on the free end of the actuator supporting said movable element in operative relation to said fixed element.

8. In a mechanism of the class described, a physical condition responsive element, an operating beam pivoted for actuation by the element, a base, a pair of fixed contacts supported on the base, a permanent magnet supported on the base adjacent the fixed contacts, an armature arranged in operative relation to the magnet, a flexible arm, a movable contact on each end of said flexible arm arranged in operative relation to the fixed contacts, an insulating supporting block, means for pivotally supporting the flexible arm and armature on the supporting block, means on the block for limiting the movement of the armature towards the magnet and for holding the contacts in rigid contactual engagement in their closed position, a resilient arm carried by the operating beam and controlled thereby, and means for connecting the supporting block with one end of the resilient arm whereby the contacts are operated with snap action.

9. In a mechanism of the class described, a physical condition responsive element, an operating beam pivoted for actuation by the element, a pair of fixed contacts supported in spaced relationship, a permanent magnet supported between the fixed contacts, a flexible arm, a pair of movable contacts supported at the ends of the flexible arm in operative relationship to the fixed contacts, an armature arranged between the movable contacts and in operative relationship to the magnet, a rigid stop bar arranged along one side of the flexible arm, a supporting block, means for pivotally supporting the armature, the flexible arm and the rigid bar together upon the supporting block, and a resilient operating means connected between the operating beam and the supporting block whereby the contacts are operated with snap action.

10. In a mechanism of the class described, a physical condition responsive element, an operating beam arranged for actuation by the element, a resilient operating arm connected to and controlled by the beam, a flexible arm and an armature pivotally supported together at their midpoint on the free end of the resilient arm for movement thereby, a movable contact carried on each end of the flexible arm, a pair of fixed contacts arranged in operative relation to the movable contacts, a permanent magnet supported between the fixed contacts and arranged so that the operation of the beam in one direction moves the armature into the influence of the magnet permitting the magnet to close the contacts with snap action and tension the flexible and resilient arms, and so that the operation of the beam in the reverse direction increases the tension of the resilient arm until it overcomes the influence of the magnet and the contacts are opened with snap action, the flexible arm maintaining the contacts closed until the balance of power between the resilient arm and magnet has been overcome.

11. In a mechanism of the class described, a base, a pair of fixed contacts spaced apart on the base, a magnet arranged on the base between the fixed contacts, a flexible arm extending between said fixed contacts and carrying a movable contact on each end thereof in operative relation to the fixed contacts, an armature arranged on one side of the flexible arm in operative relation to the magnet, a rigid bar arranged on the opposite side of the flexible arm parallel thereto and adapted to engage the rear side of the movable contacts after they engage the fixed contacts, means for clamping the armature, flexible arm and rigid bar together as a unitary structure at their midpoint, an insulating block, means for pivotally supporting said unitary structure at its midpoint upon the insulating block, a resilient operating arm connected at one end to the insulating block, physical condition responsive means connected to the other end of the resilient operating arm for operating the same whereby the contacts are actuated with snap action, a stop member on the insulating block, and a stiff arm actuated by the condition responsive means into engagement with the stop arm to pry the contacts loose in case the resilient operating arm fails to do so.

12. A control mechanism of the class described comprising a supporting base, an operating beam, means for pivoting said beam upon the supporting base, physical condition responsive means connected to one end of the beam for actuating the same about its pivot, switching mechanism controlled by the movement of the operating beam, resilient means comprising a first and second spring member arranged to oppose the condition responsive means, adjusting means connecting one end of each spring member to the supporting base for adjusting the mechanism to respond to a particular value of the physical condition, calibrating means connecting the other end of the first spring member to the operating beam for calibrating the adjustment, other calibrating means connecting the other end of the second spring member with the operating beam only after the beam has moved a predetermined amount against the opposing action of the first spring member, and an additional calibrating means between the operating beam and the switching mechanism.

13. A switching mechanism of the class described comprising, an insulating terminal block, a pair of elongated terminal plates supported in spaced relationship upon the face of the block, a contact stud arranged on one end of each terminal plate, a terminal screw arranged on the other end of each terminal plate, a permanent magnet supported on the block between the two contact studs, movable switching means including a pair of spaced contacts arranged in operative relation to the contact studs and an armature in operative relation to the magnet, and an insulated barrier member projecting from the face of the terminal block between the ends of the terminal plates for separating the terminal screws from the contacts and magnet.

14. A switching mechanism of the class described comprising, an insulating block, a pair of terminal plates spaced apart upon the face of the block, a contact stud projecting from one end of each terminal plate, a permanent magnet supported on the block face between the two contact studs, a terminal screw threaded into the other end of each terminal plate, movable switching means including a pair of spaced contacts arranged in operative relation to the contact studs, flexible means for supporting the contacts from each end thereof, resilient operating means, means for supporting said flexible means from said operating means whereby said contacts are moved into and out of engagement with the contact studs, an armature supported on said resilient operating means in operative relation to the permanent magnet whereby snap action is imparted to the operation of the contacts, and an insulating barrier member extending from the face of the insulating block and between the terminal plate ends for separating the terminal screws from the contacts and magnet.

15. In a control device of the class described, a main supporting base, a bellows, a supporting plate having an opening therein, means for securing one end of the bellows to one side of the supporting plate around the opening therein, connecting means on the other side of the supporting plate opening for extending a source of fluid under pressure to the bellows, a cover for said bellows secured to the edge of the supporting plate, means for securing the cover to the main supporting base, switching mechanism including an operating beam therefor supported upon the main base, adjustable connecting means extending from the opposite end of the bellows into engagement with the operating beam whereby the operation of the bellows effects the movement of the switching mechanism, a hollow tube secured to said supporting plate around the opening therein and extending inside said bellows to a position adjacent the opposite end thereof, said tube preventing collapse of said bellows when the pressure is reduced to a vacuum, and a coiled spring member surrounding the hollow tube for assisting the operation of the device when operating on the vacuum side.

16. In a control device of the class described, a supporting base, a bellows, a supporting plate having an opening therein, means for securing one end of the bellows around the supporting plate opening, a cup shaped cover for the bellows secured at its periphery to the supporting base, means for securing the supporting plate to the periphery of the cover, means secured to the bottom of the cover for extending a source of fluid under pressure to the bellows for actuating the same, a rod secured to the other end of the bellows and extending inside thereof and through the supporting plate opening and the base, switching mechanism supported on the base, means connecting the switching mechanism with the rod whereby it is operated by action of the bellows, a hollow tube supported from the base and extending down into the bellows around the rod to a position opposite the other end thereof to prevent collapse of the bellows when the pressure is reduced to a vacuum, and a coiled spring inside the hollow tube and around the rod having one end engaging the bottom end of the tube and the other end engaging a shoulder on the rod, said coiled spring assisting the operation of the device when operating on the vacuum side.

17. In a control device of the class described, a supporting base, an operating beam pivotally supported upon the base, physical condition responsive means supported upon the base for actuating said beam, a U-shaped bracket having its ends secured to the supporting base, a fixed contact and a magnet supported upon one leg of the bracket, an armature and a flexible contact arm, a resilient arm for supporting the armature and contact arm in operative relation to the magnet and fixed contact respectively, whereby the contacts are operated with snap action, a lever pivoted to the portion of the bracket opposite the operating beam and connected to the resilient arm for moving the same, and an operating link member pivotally connecting the operating beam with the lever and arranged parallel to the bracket legs.

18. In a switching mechanism, a movable contact operating structure adapted to cooperate with a fixed contact structure including a magnet for providing snap action to the contacts, an operating arm for actuating the movable contact structure, a supporting member rigidly secured to the end of the operating arm, a rigid bar, an armature arranged to cooperate with the magnet, a flexible arm carrying a movable contact on each of its ends, means for rigidly securing the rigid bar, the armature and the flexible arm together between their ends in spaced relationship to form a unitary structure, and means for pivoting the unitary structure to the supporting member for limited rotative movement, said rigid bar engaging the movable contacts as the flexible arm is flexed to hold the contacts firmly in engagement, the pivoting arrangement of the unitary structure providing for equal pressure upon both sets of contacts.

19. A control device comprising a base, an operating beam pivoted upon the base, pressure responsive means on the base for effecting a movement of the beam, a spring connected to the beam for modifying the effect of the pressure means upon the beam, adjustable means connected to one end of the spring for varying the modifying effect of the spring upon the beam, a pair of fixed contacts on the base, a magnet on the base, an armature on the beam arranged in operative relation to the magnet, a flexible arm and a rigid bar secured together as a unit, a pair of movable contacts carried on the unit in operative relation to the fixed contacts with at least one of the movable contacts carried on the flexible arm spaced from the rigid bar, and means for freely pivoting the unit with limited movement upon the beam for providing equal pressure upon both sets of contacts.

20. A control device comprising a base, an operating beam, spring hinge means for pivotally supporting the beam upon the base, pressure responsive means on the base for effecting a movement of the free end of the beam, a spring connected to the beam for modifying the effect of the pressure responsive means upon the beam, means connected to one end of the spring for adjustably varying the modifying effect of the spring upon the beam, an insulating block carried on the movable free end of the beam, control means comprising a pair of fixed and a pair of movable contacts, a permanent magnet, said magnet and fixed contacts supported on the base, an armature carried by the insulating block and arranged in operative relation to the magnet, a flexible arm and a rigid bar secured together as a unit, means for supporting the movable contacts on the unit, and means for pivotally supporting the unit with a limited movement from the insulating block for providing equal pressure upon both sets of contacts, said unit arranged on one side of the armature and carrying the movable contacts, said flexible arm flexing after the contacts are closed whereby the rigid bar holds the contacts firmly in engagement.

21. In a switching mechanism, physical condition responsive means, a supporting member rigidly secured to the movable end of the condition responsive means, a pivot pin carried by the supporting member, a rigid bar having a pair of ear members formed between its ends and through which said pivot pin extends whereby the rigid bar is adapted to freely rotate a limited amount about the pivot pin, a flexible arm supported on the rigid bar and pivoted therewith as a unit, a pair of fixed contacts, a movable contact carried on each end of the pivoted unit and adapted to engage the fixed contacts in response to the actuation of the condition responsive means, at least one of the movable contacts carried on the flexible arm in spaced relation to the rigid bar, the pivoting arrangement of the unit permitting equal contact pressure to be applied to each set of contacts, and magnetic means for providing snap action to the operation of the contacts.

22. In a switching mechanism, physical condition responsive means, a rigid arm, a cooperating pin and ear means for freely pivoting the rigid arm for a limited amount of movement upon the physical condition responsive means, a flexible arm carried by the rigid bar and forming a pivoted unit therewith, a pair of fixed contacts, a pair of movable contacts carried on the ends of the unit and adapted to engage the fixed contacts in response to the movement of the physical condition responsive means, at least one of the movable contacts carried on the flexible arm in spaced relationship to the rigid bar when the contacts are not engaged, the pivoting arrangement of the unit permitting equal contact pressure to be applied to each set of contacts by the rigid bar when they are engaged, and magnetic means for providing snap action to the operation of the contacts.

23. In a mechanism of the class described, a resilient operating arm adapted to have an actuating force applied to one end thereof, a supporting member operatively connected to the other end of said arm for movement thereby, a flexible arm and an armature pivotally supported together at their midpoint on said member for movement thereby, a movable contact carried on each end of the flexible arm, a pair of fixed contacts arranged in operative relation to the movable contacts, a permanent magnet supported adjacent the fixed contacts and arranged so that the actuation of said operating arm in one direction moves the armature into the influence of the magnet permitting the magnet to close the contacts with a snap action and tension said flexible and resilient arms, and so that actuation of the operating arm in the reverse direction increases the tension of the resilient arm until it overcomes the influence of the magnet and the contacts are opened with a snap action, the flexible arm maintaining the contacts closed until the balance of power between the resilient arm and the magnet has been overcome.

24. In a control device the combination of a base, magnetic means comprising a magnet element and an armature element, a first one of said elements being mounted in fixed relation to said base, a yielding actuator operatively associated with the second one of said elements to move said second element into and out of cooperating magnetic relation to said first element with a yielding force whereby during the terminal portion of such an approaching movement the speed of said second element is accelerated magnetically and during the initial portion of such a retracting movement is magnetically retarded, a pair of fixed contacts on said base, a pair of movable contacts, and pivoted equalizer means operatively supporting said movable contacts on said actuator and including a yielding lost motion means operable to maintain said movable contacts engaged with said stationary contacts during said terminal and initial portions respectively of said approaching and retracting movements of said second element.

25. In a control device the combination of a base, magnetic means comprising a magnet element and an armature element, a first one of said elements being mounted in fixed relation to said base, a yielding actuator operatively associated with the second one of said elements to move said second element into and out of cooperating magnetic relation to said first element with a yielding force whereby during the terminal portion of such an approaching movement the speed of said second element is accelerated magnetically and during the initial portion of such a retracting movement is magnetically retarded, a pair of fixed contacts on said base, a pair of movable contacts, an equalizer bar pivoted adjacent its midpoint on said yielding actuator, and means operatively supporting said movable contacts adjacent opposite ends of said equalizer bar including a resilient mounting for at least one of said movable contacts, whereby said contacts are engaged with equalized contact pressure and are maintained in an operative contacting relation during said initial portion of the retracting movement of said second element of said magnetic means.

JULIUS K. LUTHE.